(12) United States Patent
Weber et al.

(10) Patent No.: US 10,376,834 B2
(45) Date of Patent: Aug. 13, 2019

(54) CONTINUOUS PROCESS AND APPARATUS FOR PURIFYING SO2-CONTAINING GASES

(71) Applicant: Chemetics Inc., Vancouver (CA)

(72) Inventors: Torsten Weber, Leichlingen (DE); Bernd Erkes, Brüggen (DE); Lucia Fernandez Lopez, Köln (DE)

(73) Assignee: CHEMETICS INC., Vancouver (CA)

( * ) Notice: Subject to any disclaimer, the term of this patent is extended or adjusted under 35 U.S.C. 154(b) by 0 days.

(21) Appl. No.: 15/563,870

(22) PCT Filed: Mar. 29, 2016

(86) PCT No.: PCT/EP2016/056781
§ 371 (c)(1),
(2) Date: Oct. 2, 2017

(87) PCT Pub. No.: WO2016/156304
PCT Pub. Date: Oct. 6, 2016

(65) Prior Publication Data
US 2018/0117529 A1 May 3, 2018

(30) Foreign Application Priority Data

Apr. 2, 2015 (EP) .................................. 15162409

(51) Int. Cl.
| | | |
|---|---|---|
| *B01D 53/14* | (2006.01) | |
| *B01D 53/18* | (2006.01) | |
| *B01D 53/75* | (2006.01) | |
| *B01D 53/86* | (2006.01) | |
| *C01B 17/76* | (2006.01) | |
| *C01B 17/765* | (2006.01) | |
| *C01B 17/56* | (2006.01) | |

(52) U.S. Cl.
CPC ......... *B01D 53/75* (2013.01); *B01D 53/1425* (2013.01); *B01D 53/1481* (2013.01); *B01D 53/18* (2013.01); *B01D 53/8609* (2013.01); *C01B 17/56* (2013.01); *C01B 17/76* (2013.01); *C01B 17/7655* (2013.01); *Y02P 20/129* (2015.11)

(58) Field of Classification Search
CPC .. B01D 53/1481; B01D 53/50; B01D 53/507; B01D 53/78; B01D 2257/302; B01D 2258/0283; C01B 17/74; C01B 17/803; C01B 17/806; C01B 17/90; C01B 2210/0071
See application file for complete search history.

(56) References Cited

U.S. PATENT DOCUMENTS

| | | | | |
|---|---|---|---|---|
| 3,436,192 A * | 4/1969 | Karlsson | ................ | B01D 53/50 208/150 |
| 3,615,196 A * | 10/1971 | Welty | ................. | B01D 53/8609 423/244.02 |
| 6,740,302 B2 * | 5/2004 | Hostalek | ................ | C01B 17/69 423/522 |
| 8,293,196 B1 * | 10/2012 | Baldrey | ................. | C01G 13/04 423/107 |
| 2004/0141909 A1 * | 7/2004 | Christensen | ............ | C01B 17/76 423/523 |
| 2010/0092374 A1 * | 4/2010 | Erkes | ..................... | B01D 53/75 423/533 |

FOREIGN PATENT DOCUMENTS

| | | |
|---|---|---|
| DE | 22 55 029 A1 | 5/1974 |
| WO | 2008/052649 A1 | 5/2008 |
| WO | 2008/064698 A1 | 6/2008 |

* cited by examiner

Primary Examiner — Timothy C Vanoy

(74) Attorney, Agent, or Firm — Seed IP Law Group LLP

(57) ABSTRACT

The invention relates to a continuous process for purifying a gas containing 60-99 percent $SO_2$ (sulfur dioxide) by volume and 1 to 40 percent steam by volume, followed by synthesis of $SO_3$ (sulfur trioxide) without first drying the gas, and to an apparatus for carrying out said method.

27 Claims, 3 Drawing Sheets

Fig. 1: Prior Art
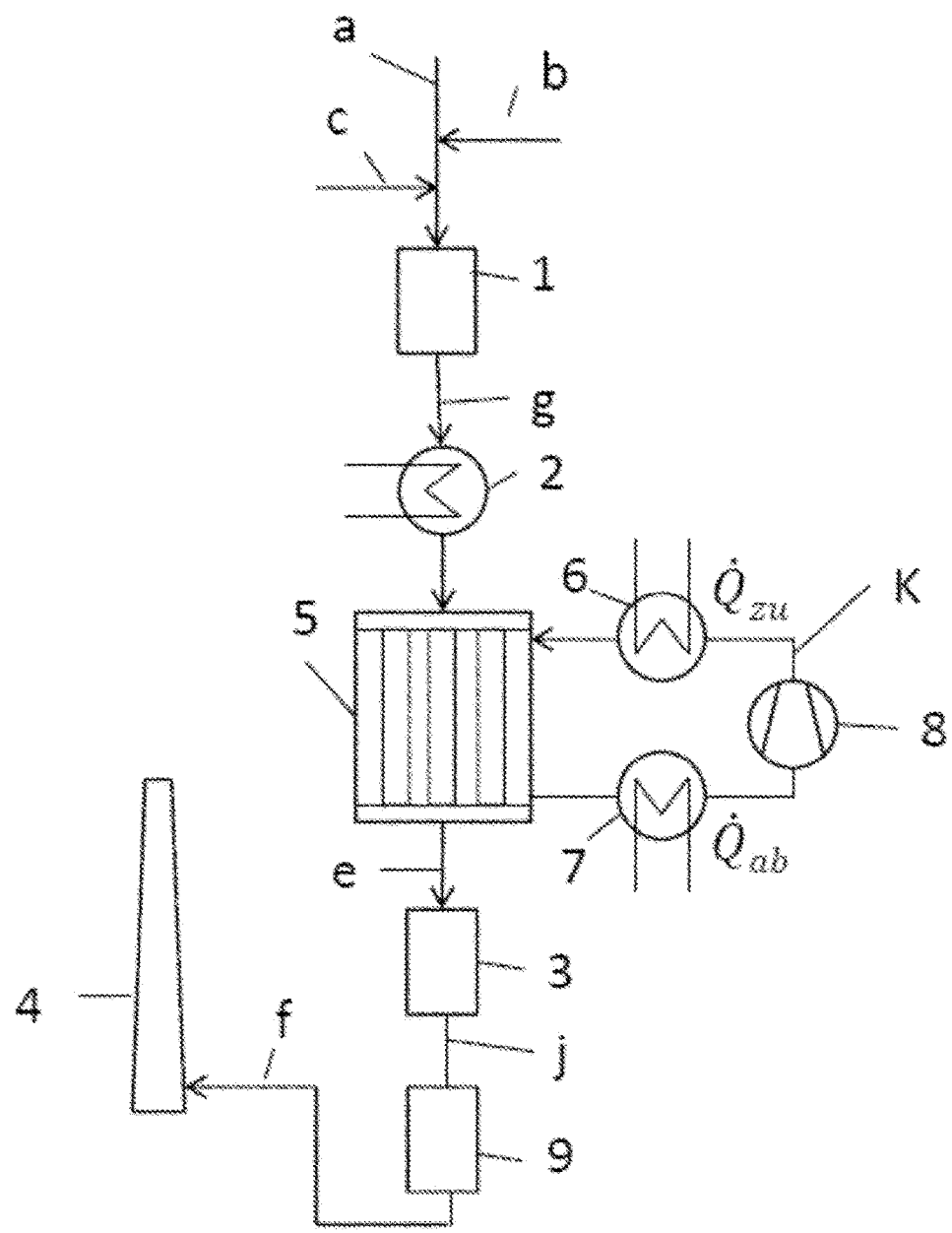

Fig. 2: Inventive embodiment
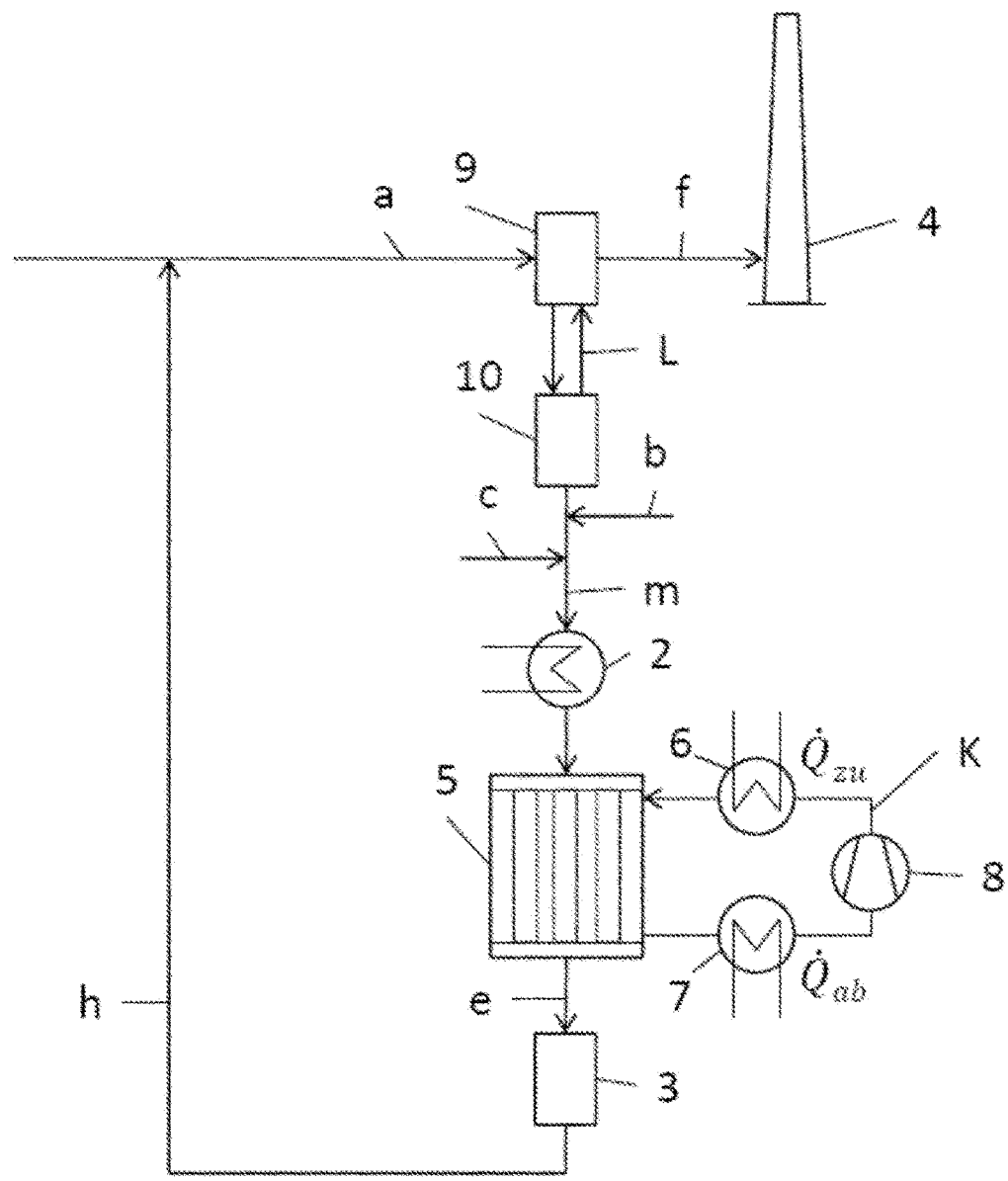

Fig. 3: Inventive embodiment
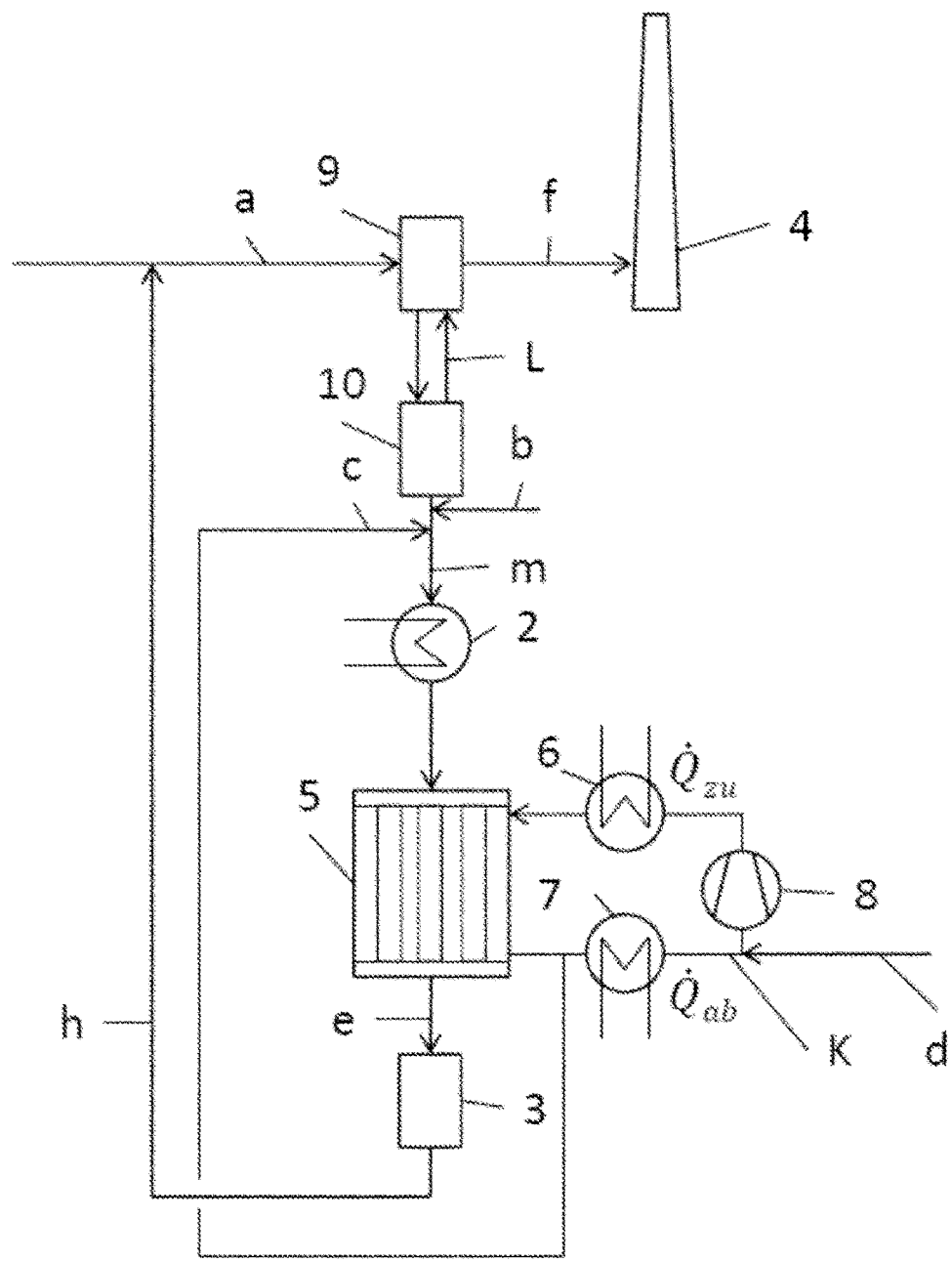

CONTINUOUS PROCESS AND APPARATUS FOR PURIFYING SO2-CONTAINING GASES

The present invention relates to a continuous method for the purification of a gas containing 60 to 99 vol.-% $SO_2$ (sulfur dioxide) and 1 to 40 vol.-% water vapor, with addition of air or of oxygen-enriched air for the subsequent preparation of $SO_3$ (sulfur trioxide), and also to a device for performing this method. The present invention relates in particular to a continuous method and a device for the purification of an $SO_2$-containing gas with subsequent production of $SO_3$, in which an $SO_2$-containing gas having an $SO_2$-content of 60 to 99 vol.-% and having a water vapor content of 1 to 40 vol.-% is mixed with air or oxygen-enriched air and is subsequently supplied to a device comprising a tube contacting device, which has upstream of it an $SO_2$ absorption and desorption system (regenerative $SO_2$ gas scrubber) and has downstream of it one or more contact stages and/or one or more $SO_3$-absorbers. Upstream of the $SO_2$ absorption and desorption system, additionally, there may be a wet gas scrubber, comprising for example a quench and one or more wet electrostatic filters. The tube contacting device here is preferably a vertical heat exchanger comprising one or more jacketed tubes, which have an inner tube and an outer tube, where a catalyst has been introduced into the inner tubes, and heat transfer takes place around these inner tubes by means of a medium which is conveyed in the space between the inner tube and the outer tube, in order on the one hand to maintain activity of the catalyst and on the other hand to prevent thermal damage to the catalyst. The heat given off in the oxidation of the $SO_2$ to $SO_3$ is then taken off by the medium in the space between the inner tube and the outer tube of the tube contacting device, via an intermediate circuit, with continuous removal of or supply of heat taking place according to the $SO_2$-content of the rich gas. Before being introduced into the tube contacting device, the $SO_2$-containing gas here is not dried, and the gas flowing out of the $SO_3$-absorber downstream of the tube contacting device is supplied again to the gas flow ahead of the $SO_2$-absorber of the regenerative $SO_2$ gas scrubber.

In the sense of the present invention, $SO_2$-containing gases having an $SO_2$-content of 50 vol.-% and more are also called $SO_2$-rich gases, or rich gases for short. The medium used in accordance with the invention is preferably air.

In numerous chemical processes and also in combustion processes with participation of sulfur-containing substances and/or substances containing sulfur compounds, and also in the case of metallurgical processes, the exhaust gases obtained include $SO_2$-containing gases. These gases cannot be discharged into the environment without purification, since $SO_2$ is toxic and has corrosive effects. Moreover, $SO_2$ is the main reason for what is called "acid rain". There are therefore statutory regulations governing the emission of $SO_2$.

Moreover, it is possible to utilize the $SO_2$, produced in the aforementioned processes, in order to produce $SO_3$, which can then be utilized further for the preparation of sulfuric acid or oleum. One possibility of supplying the $SO_2$ formed in the aforementioned processes to a further utilization lies in the purification of the $SO_2$ by regenerative $SO_2$ gas scrubbing, from which the rich gas is obtained.

In order to purify the $SO_2$-containing exhaust gases, they are first of all passed into a first absorber, a gas scrubber, where an aqueous scrubbing liquid lowers the $SO_2$-content in the exhaust gas to such an extent that it conforms to the particular statutory provisions and the exhaust gas thus purified can be discharged into the environment. Scrubbing liquids suitable for this purpose are prior art and are known to the person skilled in the art. Since, on the one hand, the scrubbing liquid likewise cannot be discharged into the environment, owing to the high $SO_2$ load, and on the other hand the $SO_2$ can be used for producing $SO_3$, the $SO_2$ is desorbed again from the scrubbing liquid, preferably thermally. The $SO_2$-rich gas recovered in this case has an $SO_2$-content of 60-99 vol.-% and a water vapor content of 1 to 40 vol.-%.

A particularly efficient method for producing $SO_3$ from $SO_2$ is the method known from WO2008052649A1. The disclosure content of WO2008052649A1 is hereby incorporated by reference, completely, into the present description. To date, however, this method has only been operated with $SO_2$-containing gases that have been dried beforehand, with a water content of below 0.1 vol.-%, usually below 0.01 vol.-%. The reason for the low water content requirement was the fear that the $SO_2$ would react with the water to form sulfurous acid and/or with the oxygen likewise present, to form $SO_3$, which would react in turn with the water, to form sulfuric acid. Sulfurous acid and sulfuric acid are highly corrosive on the walls of the apparatuses of the device, which therefore would have to be lined more thickly and/or with more corrosion resistant material, which would have made the apparatuses more expensive. Another fear was that sulfuric acid formed in the gas phase in the $SO_3$-absorber would lead to considerable formation of sulfuric acid mist, which would have to have been removed from the gas stream downstream of the $SO_3$-absorber, using measures which would be very costly and inconvenient. As a result of these circumstances, the devices according to WO2008052649A1 in which the method in question was performed were provided with a gas dryer, which forced the water content of $SO_2$-containing gas on entry into the tube contacting device below 0.1 vol.-%, usually below 0.01 vol.-%.

Methods for the oxidation of $SO_2$ to $SO_3$ using $SO_2$-containing gases having a water content of 1 vol.-% or more, however, are known from the prior art.

For instance, WO2008064698A1 discloses a method for the oxidation of $SO_2$-containing gas which has a water content of up to 30 vol.-%, where the $SO_2$-content may likewise be up to 30 vol.-%. In this case, the sulfuric acid formed is condensed and taken off in two stages via heat exchangers, thereby avoiding extreme formation of sulfuric acid mist. Disadvantageous aspects of this method, however, are that because of the condensation it is very costly and inconvenient in terms of apparatus and engineering materials, and the condenser is fitted with vitreous silica tubes, owing to the extremely corrosive conditions, a factor which leads to high costs and also to restricted mechanical load-bearing capacity on account of the risk of glass breakage. Moreover, with this method, the $SO_2$-content is limited to a maximum of 30 vol.-%.

WO2013045558A1 discloses a method for the oxidation of $SO_2$-containing gases having a water content of at least 0.1%, in which the $SO_2$-content is less than 100 vol.-%. In this case, after just the first passage of the $SO_2$-containing and water-containing gas through the oxidation step, the resultant $SO_3$ is taken up in water, to form sulfuric acid, which is taken off after a condensation step. A disadvantage of this method, here as well, is the condensation step, which is costly and inconvenient in terms of apparatus and energy, and which here as well results in high costs.

It is an object of the present invention, therefore, to provide a continuous method and a device for the purification of $SO_2$-containing exhaust gases, with which it is possible to carry out catalytic oxidation of gases with high $SO_2$-content and high water content to form $SO_3$, without gas drying beforehand. Method and device are to be simple to design, in terms of energy and apparatus, in comparison to the prior art, and are therefore to be economical and cost-effective. The method for the oxidation is, in particular, to be a single-stage method and is to include neither a method step for the condensation of the sulfuric acid resulting from the $SO_3$ formed, nor a method step for the drying of gas. The device is to be suitable for performing this method and is to have neither an apparatus for condensing the sulfuric acid resulting from the $SO_3$ formed, nor an apparatus for the drying of gas.

$SO_2$-containing exhaust gases in the sense of the present invention are the $SO_2$-containing gases which have left the original site of formation of the $SO_2$, for example the combustion operation or the metallurgical operation, and are supplied to the gas scrubber.

The object is achieved by the subject matter of the independent claims. Preferable embodiments are found in the subclaims.

In terms of the method, the object is achieved in accordance with the invention by a method for the purification of $SO_2$-containing exhaust gases, comprising the following steps:

(a) introducing the $SO_2$-containing exhaust gas into a gas scrubber and absorbing $SO_2$ in the scrubbing liquid,
(b) supplying the scrubbing liquid loaded with $SO_2$ into the desorber, desorbing $SO_2$ under generation of $SO_2$-containing rich gas with an $SO_2$-content of 60 to 99 vol.-% and with a water content of 1 to 40 vol.-%, and returning the $SO_2$ deplenished scrubbing liquid into the gas scrubber,
(c) supplying the $SO_2$-containing rich gas into a gas pre-heater, wherein air is added to the $SO_2$-containing rich gas before it enters the gas pre-heater,
(d) heating the $SO_2$-containing rich gas with the added air in the gas preheater, preferably to a temperature of 380 to 480° C., more preferably to a temperature of 400 to 450° C.,
(e) oxidizing the $SO_2$ contained in the $SO_2$-containing rich gas to $SO_3$ in a tube contacting device,
(f) absorption of the resulting $SO_3$ in a $SO_3$-absorber,
(g) discharging gases that have not been absorbed in the $SO_3$-absorber and supplying these gases into the $SO_2$-containing exhaust gas before it enters the gas scrubber, wherein the air that is added to the $SO_2$-containing rich gas before it enters the gas pre-heater in step (c) has a temperature that is considerably higher than the temperature of the $SO_2$-containing rich gas; in other words, it has been pre-heated.

Preferably, the temperature of said air during the addition to the rich gas in step (c) is from 300 to 600° C., preferably from 380 and 560° C., more preferably from 400 to 520° C. The composition of the gas after addition of the air is, for example: 20 vol.-% SO2, 16 vol.-% O2, 60 vol.-% N2, 4 vol.-% H2O.

Preferably, in turn, a volume ratio of $O_2/SO_2$ is set to 0.5 to 1.2, preferably from 0.7 to 1.1, more preferably from 0.9 to 1.0 by the supply of air in step (c).

Preferably, the gas that has not been absorbed in the $SO_3$-absorber in step (f) contains less than 10, preferably less than 5, more preferably less than 2 vol.-% $SO_2$, and contains predominantly nitrogen and oxygen as other constituents.

Preferably, in turn, this air is withdrawn from the intermediate circuit for the supply and/or removal of heat to or from the oxidation of the $SO_2$ to $SO_3$ in the space between the inner tube and the outer tube of the tube contacting device.

In a further embodiment according to the invention, in addition to the adding of air prior to entry of the $SO_2$-containing rich gas into the gas pre-heater, it is also possible for oxygen to be added before the entry of $SO_2$-containing rich gas into the gas pre-heater. This raises the oxygen content of the rich gas, thus promoting the conversion of $SO_2$ to $SO_3$.

In a further embodiment according to the invention, additionally to this, air and/or oxygen may also be added to the $SO_2$-containing rich gas after the $SO_2$-containing rich gas has exited the gas pre-heater. As a result, on the one hand, the gas pre-heater can be kept relatively small, and on the other hand, this gas pre-heater can be made more effectively regulatable. The air which is added to the $SO_2$ after the departure thereof from the gas pre-heater is preferably likewise preheated and has a temperature of 300 to 600° C., preferably of 380 and 560° C., more preferably of 400 to 520° C. Preferably, in turn, this air as well is withdrawn from the intermediate circuit for the supply and/or removal of heat to or from the oxidation of the $SO_2$ to $SO_3$ in the space between the inner tube and the outer tube of the tube contacting device.

The $SO_2$-content of the $SO_2$-rich gas in step (b) is preferably 80 to 98 vol.-% with a water content of 20 to 2 vol.-%, more preferably 90 to 96 vol.-% with a water content of 10 to 4 vol.-%.

The effect of adding the pre-heated air is that in the flow direction of the rich gas, the dew points of sulfurous acid and/or sulfuric acid are not reached or undershot at any point in the method following addition of the air. This prevents the possibility of sulfurous acid and/or sulfuric acid depositing on the walls of the device and causing corrosion. The addition of oxygen, as is provided in certain embodiments, does not lower the temperature of the rich gas to such an extent that the dew points of sulfurous acid and/or sulfuric acid are reached or undershot, since, on the one hand, the oxygen is dry, and on the other hand it is added only in small quantities in relation to the air.

The exhaust gas that has been purified of $SO_2$ in the gas scrubber can then be discharged—via an outlet, for example—to the environment. This exhaust gas is optionally subjected, upstream or downstream of the first gas scrubber, to further purification steps for the purpose of removing further environmentally harmful substances.

In an alternative embodiment of the method, the pre-heated air does not come from the intermediate circuit, but is instead preheated in another way such that on addition to the $SO_2$-containing rich gas it has a temperature of 300 to 600° C., preferably of 380 and 560° C., more preferably of 400 to 520° C. Devices and methods for this purpose are known from the prior art to the person skilled in the art.

In the case of the method according to the invention, there is no need either to condense the sulfuric acid resulting from the $SO_3$ formed, or to dry the rich gas prior to its entry into the tube contacting device.

With regard to the device, the object is achieved by means of a device comprising the following components: a supply for the $SO_2$-containing exhaust gas into the gas scrubber, a first absorber for absorbing the $SO_2$ in a scrubbing liquid, a desorber for desorbing the $SO_2$ from the scrubbing liquid, wherein the gas scrubber and the desorber are connected by a scrubbing agent circuit, a supply for the $SO_2$-rich gases generated in the desorber into the tube contacting device, wherein this supply provides a feed of air, a tube contacting device, an SO$_3$-absorber for the absorption of the SO$_3$ formed in the tube contacting device, a recirculation line for recirculating the gas stream from the SO$_3$-absorber into the supply for the SO$_2$-containing exhaust gas to the gas scrubber. The tube contacting device preferably comprises an intermediate circuit for the supply and/or withdrawal of heat to or from the oxidation of SO$_2$ to SO$_3$, and the intermediate circuit preferably comprises a cooling device, a fan or a pump and/or a heating device. The device of the invention does not comprise an apparatus for condensation of the sulfuric acid resulting from the formed SO$_3$, or an apparatus for drying gases.

As a medium for the supply of heat and/or removal of heat via the intermediate circuit, it is possible in principle to give contemplation to heat transfer oils, salt solutions or salt mixtures, steam, gases and air. Air is a preferred heat-exchange medium, since on the one hand it is cheap and on the other hand air from the intermediate circuit can be utilized in order to be added to the SO$_2$-containing rich gas in step (c). In that case, the device of the invention comprises a supply line for pre-heated air, which is added to the SO$_2$-rich gas before it enters the gas pre-heater, wherein this supply line is connected to the circuit line of the intermediate circuit.

If air is removed from the intermediate circuit, the same amount of air must be supplied to this circuit again at an appropriate point, preferably downstream of the first cooling device of the intermediate circuit, in the flow direction, and upstream of the fan of the intermediate circuit.

If, for example, heat transfer oils, salt solutions or salt mixtures are used as heat-exchange medium in the intermediate circuit, rather than air, they may serve for delivering the heat stored within them to another point in the present method or else in a different method. Thus, for example, the gas pre-heater may be heated by a heat-exchange medium of this kind.

In one embodiment of the device of the invention, a plurality of tube contacting devices are connected in series or parallel.

In other embodiments, the device, downstream of the tube contacting device, comprises:
 one or more contact stages, optionally with an oleum/intermediate absorber
 a SO$_3$-absorber and
 optionally an exhaust gas purification unit.

In accordance with the invention, the method and the device can be realized in different approaches, depending on the SO$_2$ input concentration to be used in the starting gas, and on the nature of the required plant, as a new plant or for the retrofitting of an existing plant.

Surprisingly it has been found that under the conditions according to the invention, the SO$_2$ contained in the rich gas was converted to SO$_3$ in the tube contacting device with a conversion of 70% to 99.9%, preferably of 80% to 99.5%, more preferably of 90% to 99%, in particular of 93 to 97%, with the rich gas having a water content of 1 to 40 vol.-% after exit from the desorber. At the same time, no increased corrosion on the apparatus was observed. By return of the gases not absorbed in the SO$_3$-absorber into the SO$_2$-containing exhaust gas prior to entry thereof into the gas scrubber, or into the wet gas scrubber positioned optionally upstream of said gas scrubber, in step (g), moreover, there is no need for the very costly and inconvenient deposition of sulfuric acid mist from these gases not absorbed in the SO$_3$-absorber.

The invention is elucidated in more detail by the following connection-principle diagrams and the description thereof, without being confined thereto.

FIG. 1 shows a schematic representation of a device for continuous catalytic oxidation of SO$_2$ to SO$_3$ from the prior art. This device and the method performed therein are already described comprehensively in example 4 and FIG. 5 of WO2008052649A1.

FIG. 2 represents an exemplary embodiment of the method of the invention, wherein an SO$_2$-rich gas is passed into a tube contacting device without gas drying beforehand.

FIG. 3 represents an embodiment of the invention, wherein the SO$_2$-containing exhaust gas is passed via a gas line into the gas scrubber.

LIST OF REFERENCE SYMBOLS

1 Gas dryer
2 Gas pre-heater
3 SO$_3$-absorber
4 Outlet (chimney)
5 Tube contacting device
6 Heating device
7 Cooling device
8 Fan/pump
9 Gas scrubber
10 Desorber
a Supply for the SO$_2$-containing exhaust gas
b Oxygen supply line
c Air supply line
d Air supply line into the intermediate circuit
e Gas line to the SO$_3$-absorber
f Gas line to the outlet (chimney)
g Gas line from the gas dryer to the tube contacting device
h Gas line to the supply for the SO$_2$-containing exhaust gas
K Circuit line of intermediate circuit (cooling/heating)
j Gas line from the SO$_3$-absorber to the gas scrubber
L Scrubbing liquid circuit
m Gas line from the desorber to the tube contacting device Example 1 (Prior Art)

In the device according to FIG. 1, the SO$_2$-containing exhaust gas is passed via the supply (a) into the gas dryer (1), after having been admixed with oxygen and/or air via the supply lines (b) and (d). The SO$_2$-containing gas, now dried to a water content below 0.1 vol.-%, is guided via the gas line (g), after preheating via the gas pre-heater (2), completely into the tube contacting device (5). The gas is subsequently guided via the gas line (e) to the SO$_3$-absorber (3). Via the gas line (j), the gas then passes for final purification into the gas scrubber (9), before being discharged to the surroundings via the gas line (f) and outlet (4).

A particular disadvantage of this device is the gas dryer positioned upstream of the tube contacting device, this gas dryer entailing increased processing and apparatus cost and complexity relative to the method of the invention and the device of the invention, respectively.

Example 2 (Inventive)

FIG. 2 represents an exemplary embodiment of the method of the invention. In this embodiment, the SO$_2$-containing exhaust gas is passed via a gas line (a) into the gas scrubber (9). In this scrubber, the gas is purified of SO$_2$ to an extent that it can be discharged to the environment via a gas line (f) and eventually an outlet (4).

The purification of the $SO_2$-containing exhaust gas in the gas scrubber (9) is accomplished by means of an aqueous scrubbing liquid. After becoming loaded with $SO_2$, this liquid is passed via the scrubbing liquid circuit (L) into the desorber (10), where it is freed of $SO_2$, preferably thermally, and is returned to the gas scrubber again.

The water-containing $SO_2$-rich gas liberated in the desorber is passed via the gas line (m) into the tube contacting device, and this $SO_2$-rich gas is enriched with air (supply line (c)) and optionally oxygen (supply line (b)) and is heated in the gas pre-heater (2) to a temperature of 380° C. to 480° C., preferably 400° C. to 450° C.

In the tube contacting device (5), which is a vertical heat exchanger comprising one or more jacketed tubes having an inner tube and an outer tube, with a catalyst having been introduced into the inner tubes, and the heat transfer taking place around these inner tubes by means of a medium which is passed in co-current or counter-current in the space formed by the inner tube and the outer tube, the $SO_2$ is then oxidized to $SO_3$. In order on the one hand to keep the catalyst active and on the other hand to prevent thermal damage to the catalyst, the tube contacting device is connected to an intermediate circuit, comprising the circuit line (K), the heating device (6), the fan/the pump (8) and the cooling device (7), which takes off excess heat from the tube contacting device or supplies heat to said device, according to requirements.

The $SO_3$ formed in the tube contacting device leaves this device via the gas line (e) and is guided by that line into the $SO_3$-absorber (3), in which the $SO_3$ is taken up in water or sulfuric acid in order to form sulfuric acid or oleum, respectively.

The gas freed of $SO_3$ is then fed via the gas line (h) into the supply (a) and is guided together with the $SO_2$-containing exhaust gas into the gas scrubber (9) again. Residues of $SO_2$ and/or $SO_3$ that are possibly present are therefore supplied to the circuit again, and do not enter the environment.

Example 3 (Inventively Preferred)

FIG. 3 represents an exemplary embodiment of the method of the invention. In this embodiment, the $SO_2$-containing exhaust gas is passed via a gas line (a) into the gas scrubber (9). In this scrubber, the gas is purified of $SO_2$ to an extent that it can be discharged to the environment via a gas line (f) and eventually an outlet (4).

The purification of the $SO_2$-containing exhaust gas in the gas scrubber (9) is accomplished by means of an aqueous scrubbing liquid. After becoming loaded with $SO_2$, this liquid is passed via the scrubbing liquid circuit (L) into the desorber (10), where it is freed of $SO_2$, preferably thermally, and is returned to the gas scrubber again.

The water-containing $SO_2$-rich gas liberated in the desorber is passed via the gas line (m) into the tube contacting device, and this $SO_2$-rich gas is enriched with air (supply line (c)) and optionally oxygen (supply line (b)) and is heated in the gas pre-heater (2) to a temperature of 380° C. to 480° C., preferably 400° C. to 450° C.

In the tube contacting device (5), which is a vertical heat exchanger comprising one or more jacketed tubes having an inner tube and an outer tube, with a catalyst having been introduced into the inner tubes, and the heat transfer taking place around these inner tubes by means of a medium which is passed in co-current or counter-current in the space formed by the inner tube and the outer tube, the $SO_2$ is then oxidized to $SO_3$. In order on the one hand to keep the catalyst active and on the other hand to prevent thermal damage to the catalyst, the tube contacting device is connected to an intermediate circuit, comprising the circuit line (K), the heating device (6), the fan/the pump (8) and the cooling device (7), which takes off excess heat from the tube contacting device or supplies heat to said device, according to requirements.

The air which is added to the $SO_2$-rich gas prior to entry into the gas pre-heater (2) is taken from the intermediate circuit line (k) by way of the supply (c) and therefore has a temperature that is considerably higher than that of the surroundings. The quantity of air taken from the intermediate circuit line (K) is supplied to the intermediate circuit line (k) again downstream of the first cooling device (7), in the flow direction, and upstream of the fan (8), by way of the supply line (d).

The $SO_3$ formed in the tube contacting device leaves this device via the gas line (e) and is guided by that line into the $SO_3$-absorber (3), in which the $SO_3$ is taken up in water or sulfuric acid in order to form sulfuric acid or oleum, respectively.

The gas freed of $SO_3$ is then fed via the gas line (h) into the supply (a) and is guided together with the $SO_2$-containing exhaust gas into the gas scrubber (9) again. Residues of $SO_2$ and/or $SO_3$ that are possibly present are therefore supplied to the circuit again, and do not enter the environment.

The invention claimed is:

1. A method for the purification of $SO_2$-containing exhaust gases, comprising the following steps:
  (a) introducing the $SO_2$-containing exhaust gas into a gas scrubber and absorbing $SO_2$ in the scrubbing liquid,
  (b) supplying the scrubbing liquid loaded with $SO_2$ into the desorber, desorbing $SO_2$ under generation of $SO_2$-containing rich gas and returning the $SO_2$ depleninshed scrubbing liquid into the gas scrubber,
  (c) supplying the $SO_2$-containing rich gas into a gas pre-heater, wherein air is added to the $SO_2$-containing rich gas before it enters the gas pre-heater,
  (d) heating the $SO_2$-containing rich gas with the added air in the gas preheater,
  (e) oxidizing the $SO_2$ contained in the $SO_2$-containing rich gas to $SO_3$ in a tube contacting device,
  (f) absorption of the resulting $SO_3$ in a $SO_3$-absorber,
  (g) discharging gases that have not been absorbed in the $SO_3$-absorber and supplying these gases into the $SO_2$-containing exhaust gas before it enters the gas scrubber,
  wherein the air that is added to the $SO_2$-containing rich gas before it enters the gas pre-heater in step (c) has a temperature that is higher than the temperature of the $SO_2$-containing rich gas.

2. The method according to claim 1, wherein the $SO_2$-containing rich gas formed in step (b) has a $SO_2$-content of 60 to 99 vol.-% and a water content of 40 to 1 vol.-%.

3. The method according to claim 1, wherein the temperature of said air during the addition to the $SO_2$-containing rich gas in step (c) is from 300 to 600° C.

4. The method according to claim 1, wherein a volume ratio of $O_2/SO_2$ is set to 0.5 to 1.2 by the supply of air in step (c).

5. The method according to claim 1, wherein the $SO_2$-containing rich gas with the added air is heated in the gas pre-heater in step (d) to a temperature of 380 to 480° C.

6. The method according to claim 1, wherein the gas that has not been absorbed in the $SO_3$-absorber in step (g) contains less than 10 vol.-% $SO_2$.

7. The method according to claim 1, wherein the rich gas is not dried before its entry into the tube contacting device.

8. The method according to claim 1, wherein the air that is added to the $SO_2$-containing rich gas in step (c) before its entry therein is withdrawn from the intermediate circuit for the supply and/or removal of heat to or from the oxidation of the $SO_2$ to $SO_3$ in the space between the inner tube and the outer tube of the tube contacting device.

9. The method according to claim 1, wherein the $SO_2$ contained in the rich gas is converted to $SO_3$ with a conversion of 70% to 99.9%.

10. A device for performing the method according to claim 1, wherein the device comprises the following components: a supply for the $SO_2$-containing exhaust gas into the gas scrubber, a first absorber for absorbing the $SO_2$ in a scrubbing liquid, a desorber for desorbing the $SO_2$ from the scrubbing liquid, wherein the gas scrubber and the desorber are connected by a scrubbing agent circuit, a supply for the $SO_2$-rich gases generated in the desorber into the tube contacting device, wherein this supply provides a feed of air, a tube contacting device, an $SO_3$-absorber for the absorption of the $SO_3$ formed in the tube contacting device, a recirculation line for recirculating the gas stream from the $SO_3$-absorber into the supply for the $SO_2$-containing exhaust gas to the gas scrubber.

11. The device according to claim 10, wherein the tube contacting device comprises an intermediate circuit for the supply and/or withdrawal of heat to or from the oxidation of $SO_2$ to $SO_3$.

12. The device according to claim 11, wherein the intermediate circuit comprises a cooling device, a fan or a pump and/or a heating device.

13. The device according to claim 10, wherein the device does not comprise an apparatus for condensation of the sulfuric acid resulting from the formed $SO_3$.

14. The device according to claim 10, wherein the device does not comprise an apparatus for drying gases.

15. The device according to claim 10, wherein the device comprises a supply line for pre-heated air, which is added to the $SO_2$-rich gas before it enters the gas pre-heater, wherein this supply line is connected to the circuit line of the intermediate circuit.

16. The method according to claim 1, wherein the $SO_2$-containing rich gas formed in step (b) has a $SO_2$-content of 80 to 98.5 vol.-% and a water content of 20 to 1.5 vol.-%.

17. The method according to claim 1, wherein the $SO_2$-containing rich gas formed in step (b) has a $SO_2$-content of 90 to 98 vol.-% and a water content of 10 to 2 vol.-%.

18. The method according to claim 1, wherein the temperature of said air during the addition to the $SO_2$-containing rich gas in step (c) is from 380 to 560° C.

19. The method according to claim 1, wherein the temperature of said air during the addition to the $SO_2$-containing rich gas in step (c) is from 400 to 520° C.

20. The method according to claim 1, wherein a volume ratio of $O_2/SO_2$ is set to 0.7 to 1.1 by the supply of air in step (c).

21. The method according to claim 1, wherein a volume ratio of $O_2/SO_2$ is set to 0.9 to 1.0 by the supply of air in step (c).

22. The method according to claim 1, wherein the $SO_2$-containing rich gas with the added air is heated in the gas pre-heater in step (d) to a temperature of 400 to 450° C.

23. The method according to claim 1, wherein the gas that has not been absorbed in the $SO_3$-absorber in step (g) contains less than 5 vol.-% $SO_2$.

24. The method according to claim 1, wherein the gas that has not been absorbed in the $SO_3$-absorber in step (g) contains less than 2 vol.-% $SO_2$.

25. The method according to claim 1, wherein the $SO_2$ contained in the rich gas is converted to $SO_3$ with a conversion of 80% to 99.5%.

26. The method according to claim 1, wherein characterized in that the $SO_2$ contained in the rich gas is converted to $SO_3$ with a conversion of 90% to 99%.

27. The method according to claim 1, wherein characterized in that the $SO_2$ contained in the rich gas is converted to $SO_3$ with a conversion of 93 to 97%.

* * * * *